(12) United States Patent
Kim

(10) Patent No.: US 10,354,164 B2
(45) Date of Patent: Jul. 16, 2019

(54) METHOD FOR DETECTING GLINT

(71) Applicant: 3E CO., LTD., Seongnam-si, Gyeonggi-do (KR)

(72) Inventor: MinHo Kim, Seongnam-si (KR)

(73) Assignee: 3E CO., LTD., Seongnam-si (KR)

( * ) Notice: Subject to any disclaimer, the term of this patent is extended or adjusted under 35 U.S.C. 154(b) by 0 days.

(21) Appl. No.: 15/632,880

(22) Filed: Jun. 26, 2017

(65) Prior Publication Data

US 2018/0137384 A1 May 17, 2018

(30) Foreign Application Priority Data

Nov. 11, 2016 (KR) ........................ 10-2016-0150425

(51) Int. Cl.
*G06K 9/00* (2006.01)
*G06K 9/46* (2006.01)
(Continued)

(52) U.S. Cl.
CPC ......... *G06K 9/4647* (2013.01); *G06K 9/0061* (2013.01); *G06K 9/00604* (2013.01); *G06K 9/50* (2013.01); *G06K 9/6215* (2013.01)

(58) Field of Classification Search
CPC . G06K 9/4647; G06K 9/6215; G06K 9/00604
See application file for complete search history.

(56) References Cited

U.S. PATENT DOCUMENTS

| 4,950,069 A * | 8/1990 | Hutchinson | A61B 3/113 351/210 |
| 8,292,433 B2 * | 10/2012 | Vertegaal | G06F 3/011 351/209 |

(Continued)

FOREIGN PATENT DOCUMENTS

| JP | 2003-314997 A | 11/2003 |
| JP | 2014-514560 A | 6/2014 |

(Continued)

OTHER PUBLICATIONS

International Search Report issued for corresponding International Patent Application No. PCT/KR2017/004043, dated May 30, 2017.

*Primary Examiner* — Wesley J Tucker
(74) *Attorney, Agent, or Firm* — Patent Office of Dr. Chung Park

(57) ABSTRACT

Receiving an iris image; detecting, among rows of the iris image, rows in each of which a number of consecutive pixels each having a brightness value above a first threshold value is larger than a second threshold value; detecting, among columns of the iris image, columns in each of which a number of consecutive pixels each having a brightness value above the first threshold value is larger than the second threshold value; selecting, among the detected rows, consecutive rows in a vertical direction whose number is larger than a third threshold; selecting, among the detected columns, consecutive columns in a horizontal direction whose number is larger than the third threshold and determining a set of the pixels as a glint if the set of pixels included in the selected rows and the selected columns and each having the brightness value above the first threshold has a predetermined shape.

10 Claims, 11 Drawing Sheets

(51) Int. Cl.
    *G06K 9/50*     (2006.01)
    *G06K 9/62*     (2006.01)

(56)     References Cited

U.S. PATENT DOCUMENTS

| | | | |
|---|---|---|---|
| 9,405,364 B2* | 8/2016 | Hansen | A61B 3/113 |
| 10,043,075 B2* | 8/2018 | Bennett | G06K 9/0061 |
| 2006/0093998 A1* | 5/2006 | Vertegaal | G06F 3/011 |
| | | | 434/236 |
| 2006/0110008 A1* | 5/2006 | Vertegaal | G06K 9/00604 |
| | | | 382/103 |
| 2008/0058593 A1* | 3/2008 | Gu | G06T 7/0012 |
| | | | 600/109 |
| 2011/0013007 A1* | 1/2011 | Holmberg | A61B 3/113 |
| | | | 348/78 |
| 2013/0088583 A1* | 4/2013 | Northcott | G06K 9/00604 |
| | | | 348/78 |
| 2015/0199008 A1* | 7/2015 | Kim | G06F 3/013 |
| | | | 345/156 |

FOREIGN PATENT DOCUMENTS

| | | |
|---|---|---|
| JP | 2016-532217 A | 10/2016 |
| KR | 10-0361141 B1 | 11/2002 |
| KR | 10-2009-0075083 A | 7/2009 |
| KR | 10-2016-0000531 A | 6/2014 |
| KR | 10-1548625 B1 | 9/2015 |

\* cited by examiner

[FIG 1]
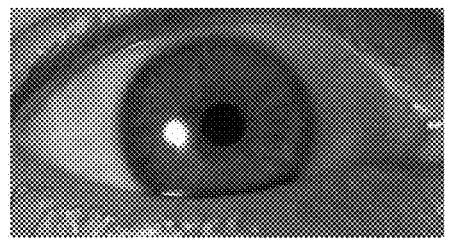
[FIG 2]
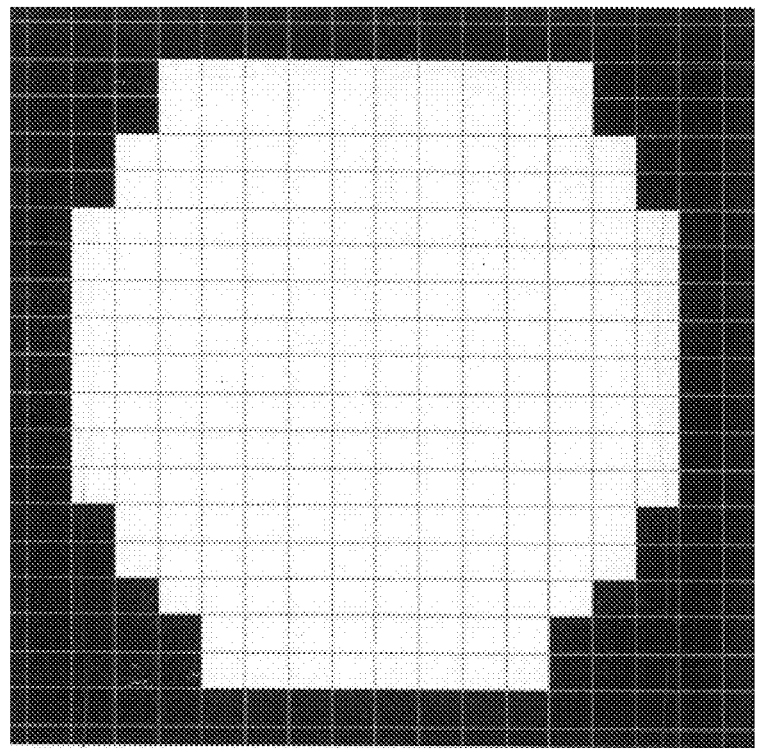

[FIG 3]
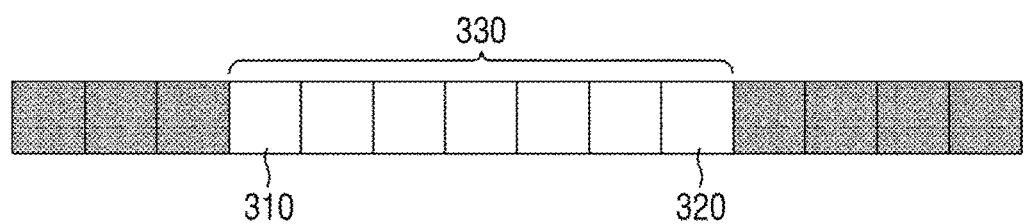

[FIG 4]
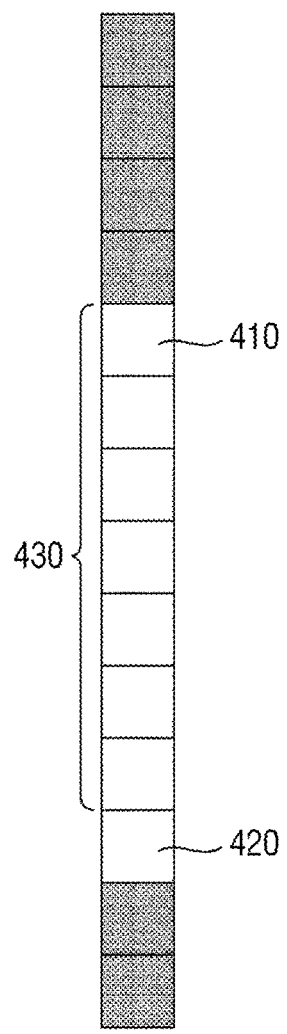

[FIG 5]
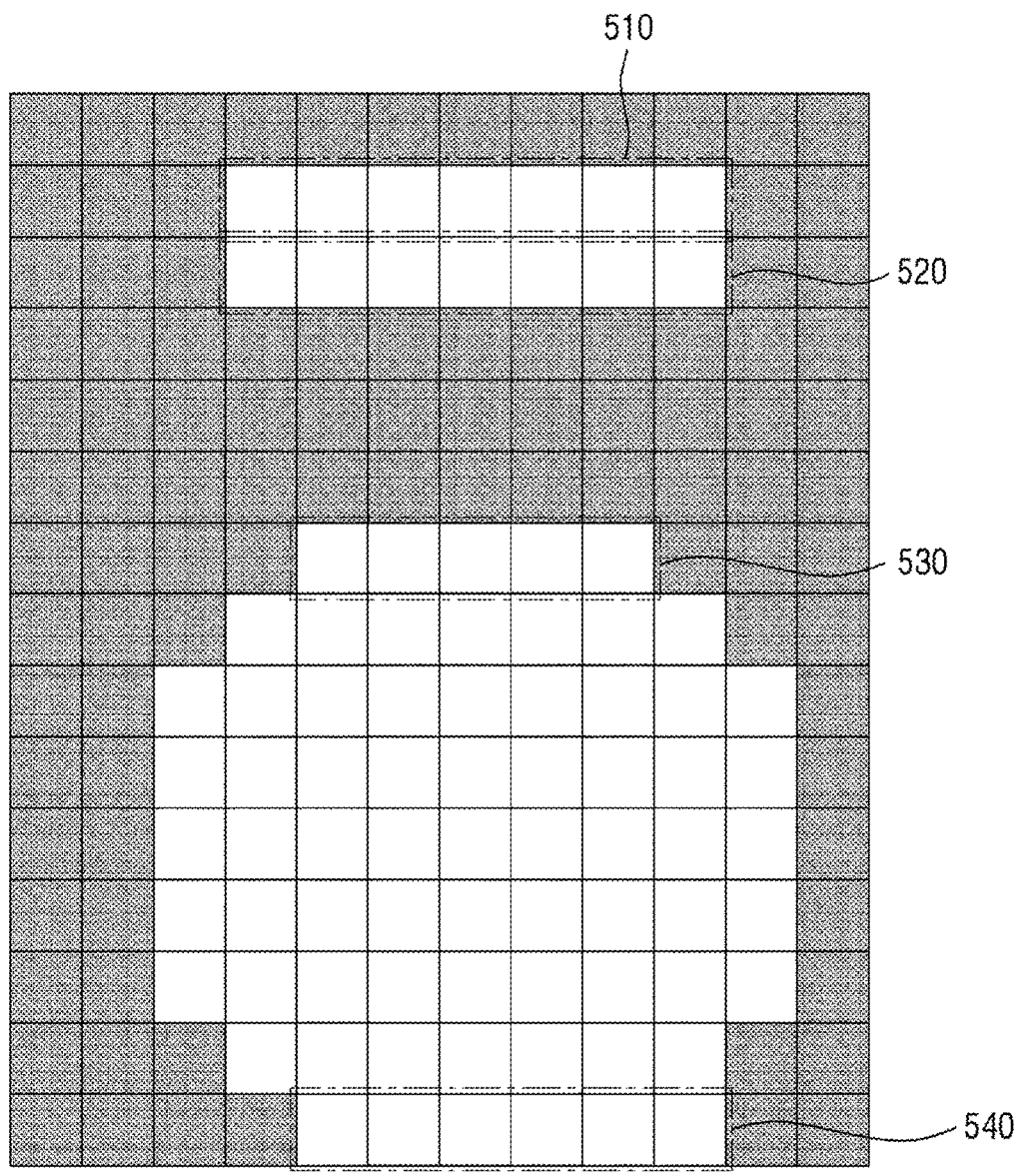

[FIG 6]
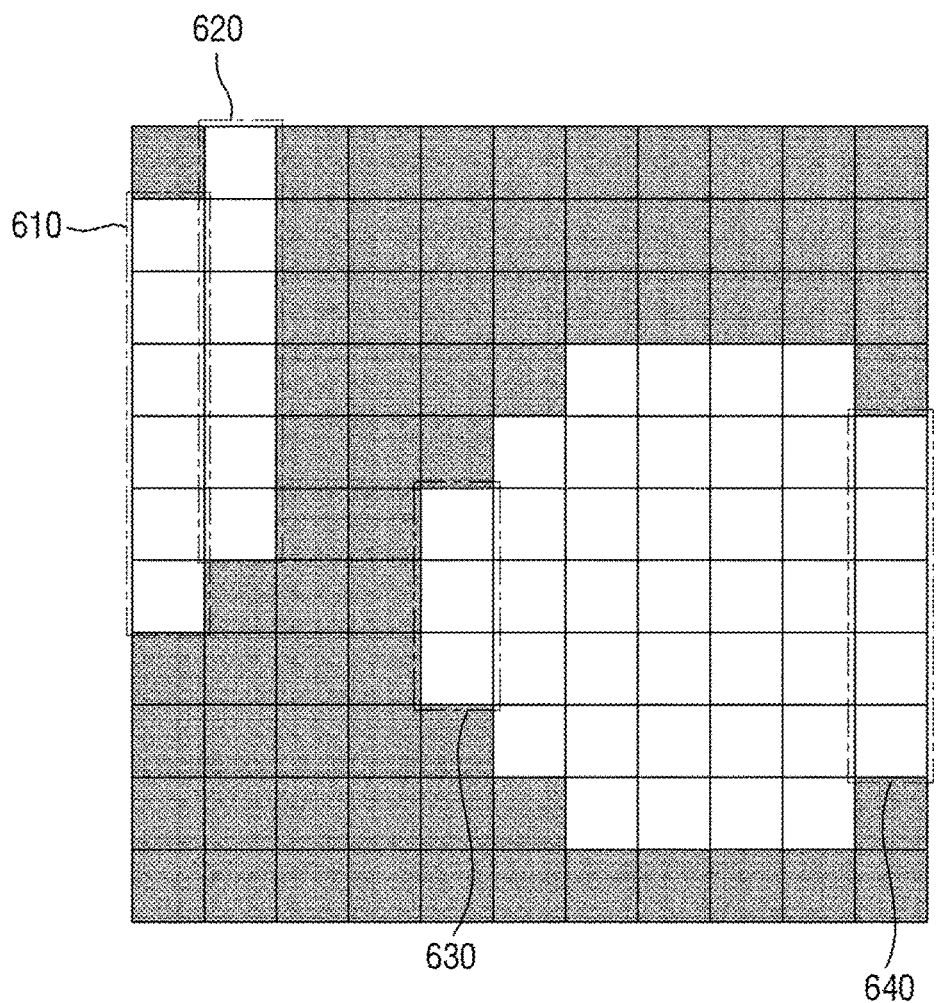

[FIG 7]
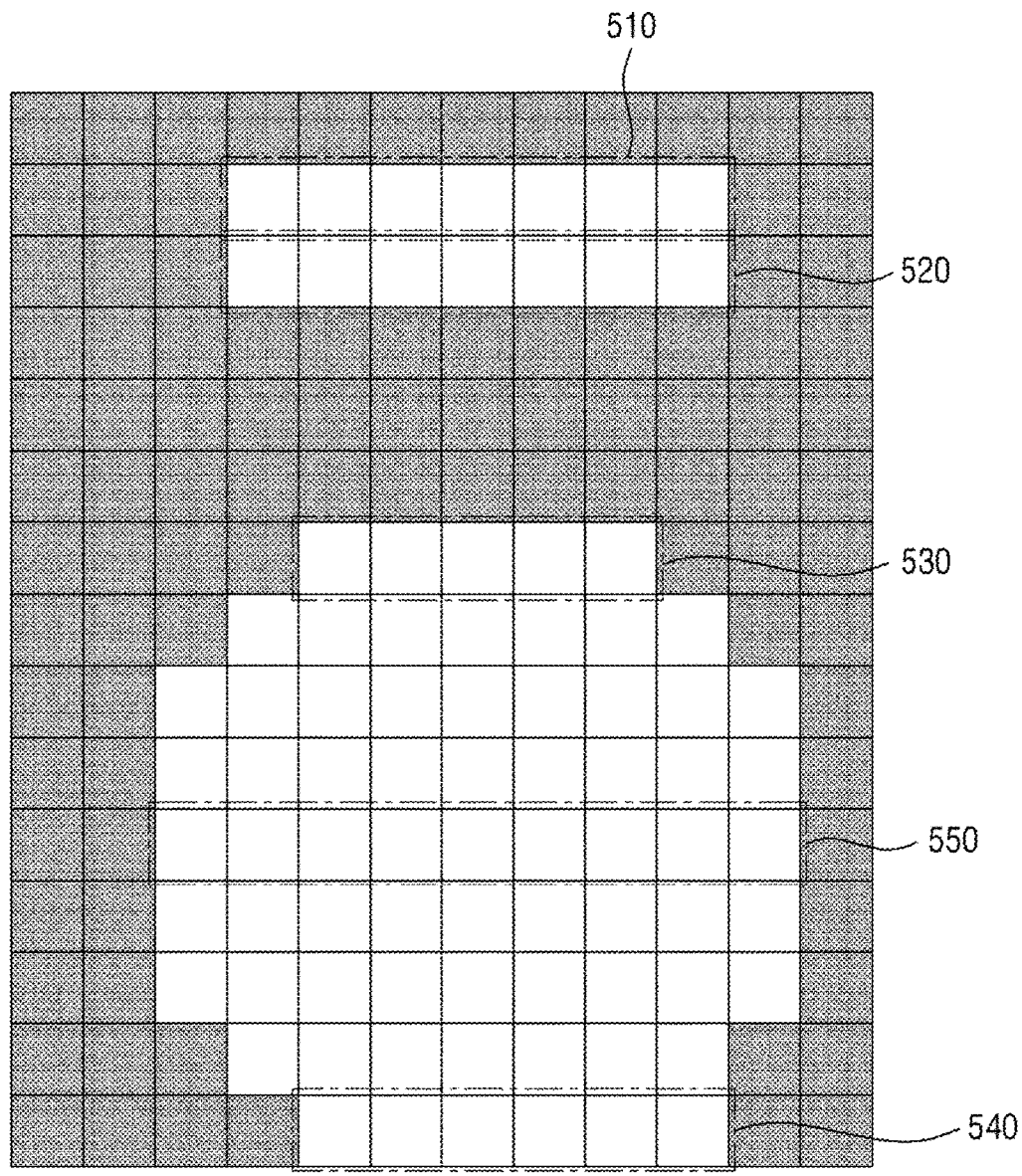

[FIG 8]
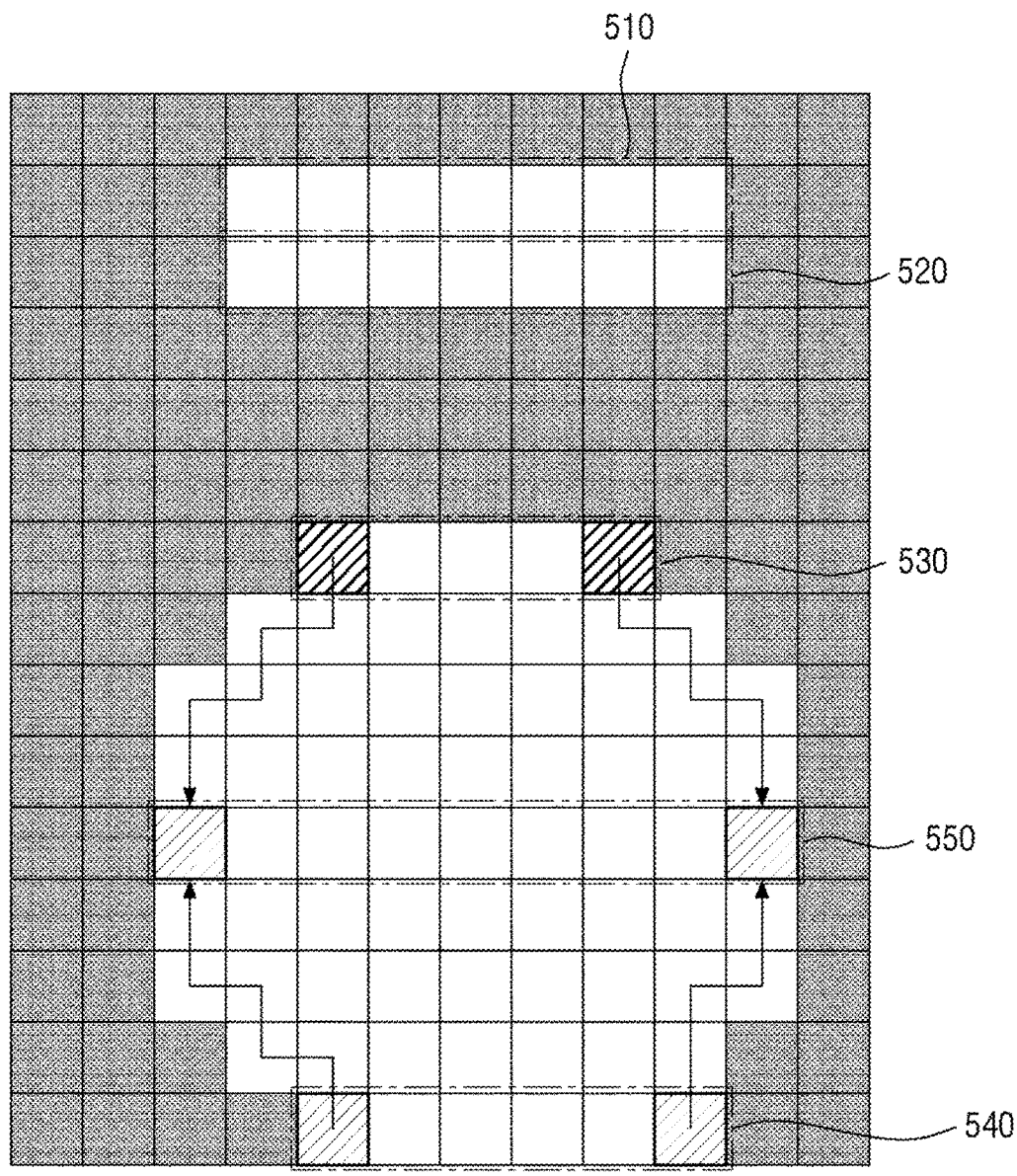

[FIG 9]
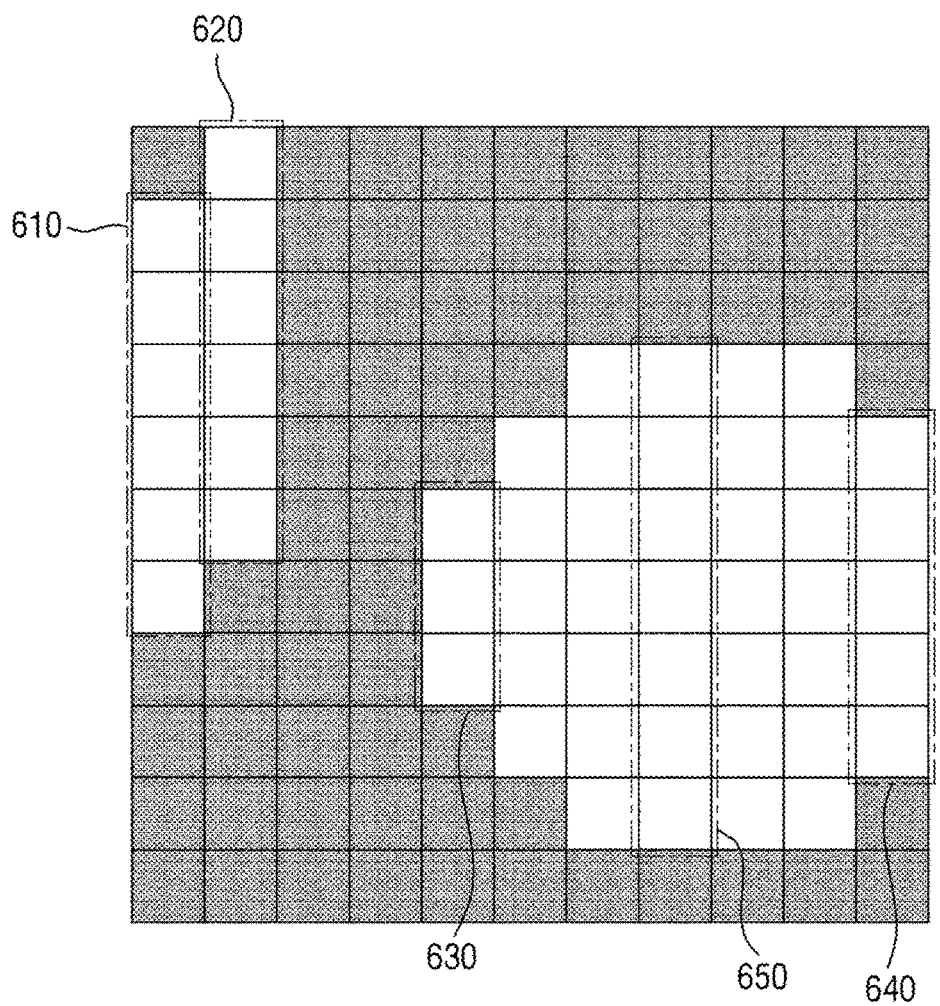

[FIG 10]
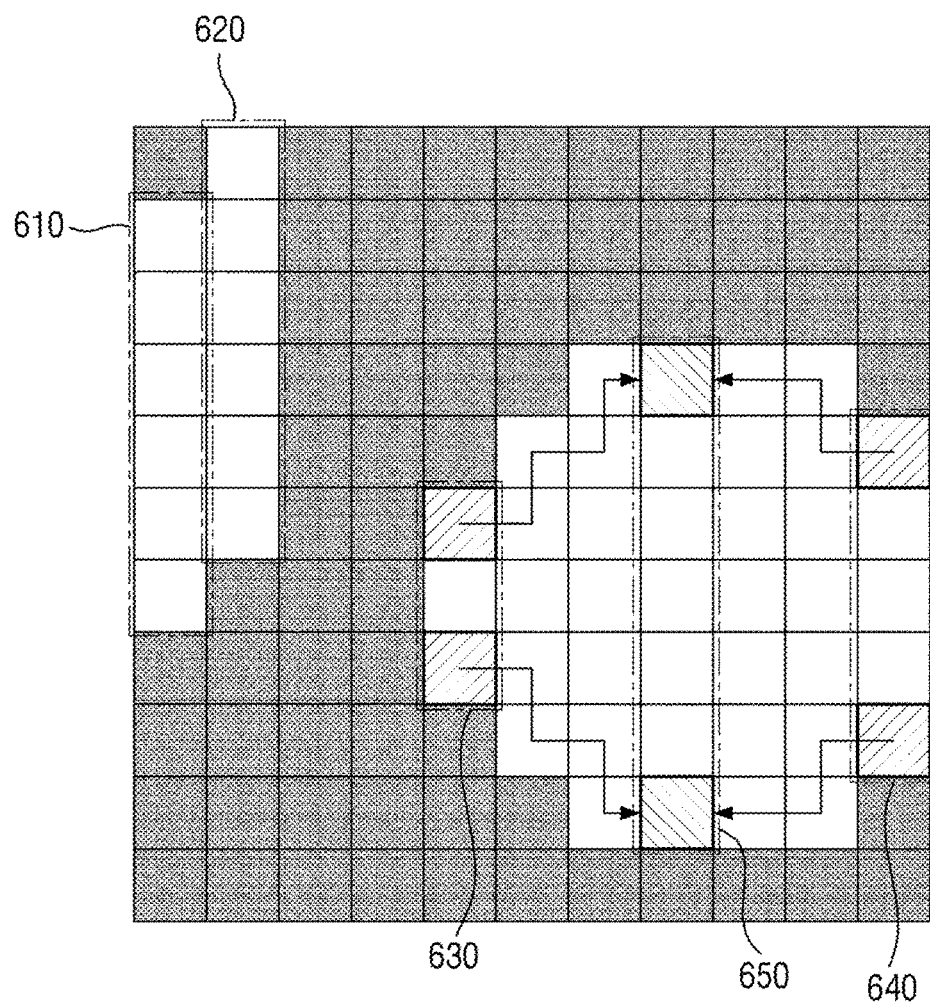

[FIG 11]
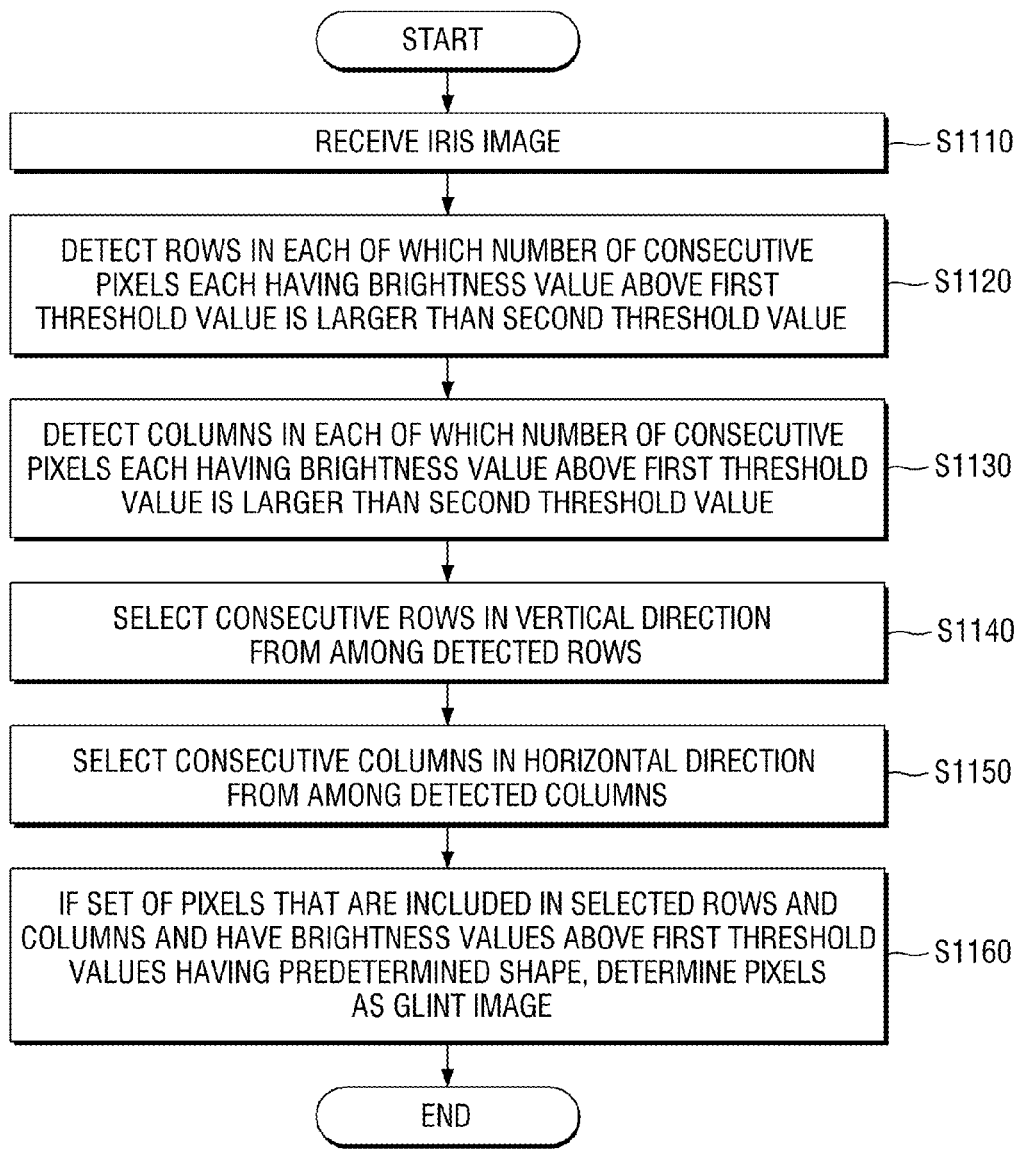

[FIG 12]
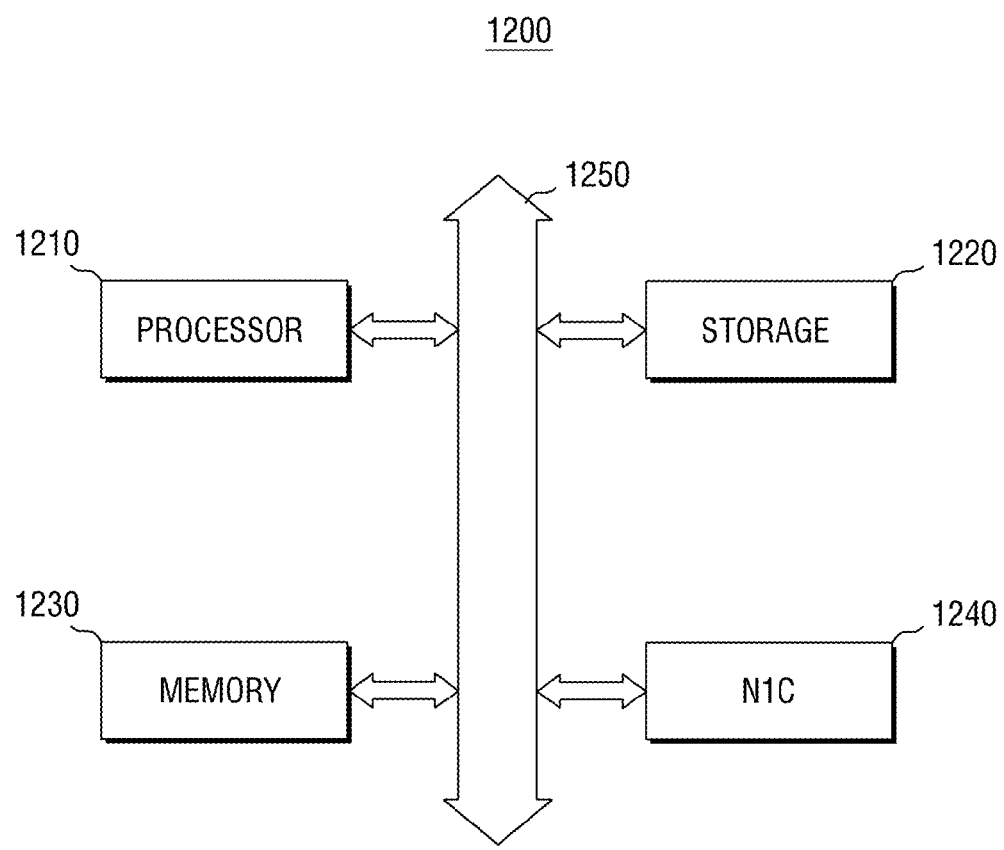

METHOD FOR DETECTING GLINT

This application claims priority from Korean Patent Application No. 10-2016-0150425 filed on Nov. 11, 2016 in the Korean Intellectual Property Office, the disclosure of which is incorporated herein by reference in its entirety.

BACKGROUND

1. Field of the Disclosure

The present disclosure relates to a method for detecting a glint, and more particularly, to a method for detecting a glint from a captured iris image of a person prior to performing an authentication procedure using the iris image.

2. Description of the Related Art

In a system for performing user authentication using a person's iris information, a process for finding the center of a pupil has to be performed in advance in order to acquire the iris information. In order to find the center of a pupil in a human eye, an illumination unit disposed provided in an iris recognition apparatus is repeatedly turned on/off to induce a change in the size of the pupil.

In doing so, the light irradiated from the illumination unit is reflected off the pupil such that a "glint" is inevitably created. When a glint is created around the iris, iris data is distorted such that the obtained iris data may not be sufficient for performing user authentication.

FIG. 1 is a view showing a glint created near the iris by the light irradiated from the illumination unit.

In order to perform a user authentication procedure using the iris data, the size of the obtained iris data has to be larger than a predetermined threshold value. If a glint is created in the iris region, the glint makes it difficult to obtain the iris data sufficient for authenticating the user.

Typically, a number of iris images are captured for user registration or user authentication. Among such iris images, it is not possible to obtain sufficient iris data from an iris image where a glint is too large.

For example, if 570 bytes of iris data is required to perform a user authentication procedure, there is no problem in acquiring iris data of 570 bytes or more when a glint is created out of the iris. However, when a glint is created in the iris region, the iris image is distorted by the glint, such that iris data of 570 bytes or more may not be obtained.

Accordingly, what is required is a method for detecting a glint, by which a glint created in an iris area during a process of acquiring a user's iris image can be detected, and an iris image from which sufficient iris data cannot be obtained due to the glint can be excluded.

SUMMARY

Aspects of the present disclosure provide a method for detecting a glint created on an iris image by the reflection of light from an illumination unit.

Aspects of the present disclosure also provide a method for detecting a glint, by which an iris image that cannot be used for user authentication due to a glint is removed in advance, thereby increasing the recognition rate while decreasing the error rate.

This and other aspects, embodiments and advantages of the present disclosure will become immediately apparent to those of ordinary skill in the art upon review of the Detailed Description and Claims to follow.

According to an exemplary embodiment of the present disclosure, it is possible to accurately detect the glint included in the iris image, such that an unnecessary iris image can be removed in advance during the user authentication process.

Further, by excluding an iris image that cannot be used for user authentication in advance, the iris recognition rate can be increased while the error rate can be decreased.

According to an aspect of the present invention provides method of detecting glint, the method comprising: receiving an iris image of a user; detecting, among rows of the iris image, rows in each of which a number of consecutive pixels each having a brightness value above a predetermined first threshold value is larger than a predetermined second threshold value; detecting, among columns of the iris image, columns in each of which a number of consecutive pixels each having a brightness value above the first threshold value is larger than the second threshold value; selecting, among the detected rows, consecutive rows in a vertical direction whose number is larger than a predetermined third threshold; selecting, among the detected columns, consecutive columns in a horizontal direction whose number is larger than the third threshold; and determining a set of the pixels as a glint if the set of pixels included in the selected rows and the selected columns and each having the brightness value above the first threshold has a predetermined shape.

According to an aspect of the present invention, wherein the detecting the rows comprises: sequentially determining the brightness value of each of the pixels of a row of the iris image to determine a first pixel having the brightness value above the first threshold value as a start point; sequentially determining the brightness value of each of the pixels of the row of the iris image to determine a last pixel having the brightness value above the first threshold value as an end point; and detecting the row if a length from the start point to the end point is larger than the second threshold value and is less than a maximum allowable length.

According to an aspect of the present invention, wherein the detecting the columns comprises: sequentially determining the brightness value of each of the pixels of a column of the iris image to determine a first pixel having the brightness value above the first threshold value as a start point; sequentially determining the brightness value of each of the pixels of the column of the iris image to determine a last pixel having the brightness value above the first threshold value as an end point; and detecting the column if a length from the start point to the end point is larger than the second threshold value and is less than a maximum allowable length.

According to an aspect of the present invention, wherein the selecting the rows comprises: sequentially searching for the rows of the iris image; upon detecting a row in which the number of the consecutive pixels each having a brightness value above the first threshold value is larger than the second threshold value, determining the detected row as a start row; and determining a last consecutive row in which the number of the consecutive pixels each having a brightness value above the first threshold value is larger than the second threshold value as an end row; and selecting only rows whose length from the start row to the end row is larger than the third threshold value.

According to an aspect of the present invention, wherein the selecting only rows whose length from the start row to the end row is larger than the third threshold value comprises: the selecting only rows whose number from the start row to the end row is larger than the third threshold value.

According to an aspect of the present invention, wherein the selecting the columns comprises: sequentially searching for the columns of the iris image; upon detecting a column in which the number of the consecutive pixels each having a brightness value above the first threshold value is larger than the second threshold value, determining the detected column as a start column; determining a last consecutive column in which the number of the consecutive pixels each having a brightness value above the first threshold value is larger than the second threshold value as an end column; and selecting only columns whose length from the start column to the end column is larger than the third threshold value.

According to an aspect of the present invention, wherein the selecting only columns whose length from the start column to the end column is larger than the third threshold value comprises: the selecting only columns whose number from the start column to the end column is larger than the third threshold value, According to an aspect of the present invention, wherein the determining the set of pixels as a glint comprises: selecting a center row positioned at a center of the rows between the start row and the end row; and determining the pixels located between the start row and the end row and each having a brightness value above the first threshold value as a glint image, if a line connecting a start point of the start row with a start point of the center row, a line connecting an end point of the start row with an end point of the center row, a line connecting a start point of the end row with the start point of the center row, and a line connecting an end point of the end row with at end point of the center row are stepwise lines.

According to an aspect of the present invention, wherein the determining the set of pixels as a glint comprises: selecting a center column positioned at a center of the columns between the start column and the end column; and determining the pixels located between the start column and the end column and each having a brightness value above the first threshold value as a glint image, if a line connecting a start point of the start column with a start point of the center column, a line connecting an end point of the start column with an end point of the center column, a line connecting a start point of the end column with the start point of the center column, and a line connecting an end point of the end column with at end point of the center column are stepwise lines.

According to an aspect of the present invention, the method further comprising: excluding the iris image from a user authentication procedure using an iris if a size of iris data of the iris image minus a glint area is less than a predetermined reference value.

According to an another aspect of the present invention provide apparatus for detecting a glint, the apparatus comprising: at least one processor; a memory configured to load a computer program executed by the processor; and a storage medium having stored a computer program for detecting a glint, wherein the computer program comprises operations of: receiving an iris image of a user; detecting, among rows of the iris image, rows in each of which a number of consecutive pixels each having a brightness value above a predetermined first threshold value is larger than a predetermined second threshold value; detecting, among columns of the iris image, columns in each of which a number of consecutive pixels each having a brightness value above the first threshold value is larger than the second threshold value; selecting, among the detected rows, consecutive rows in a vertical direction whose number is larger than a predetermined third threshold; selecting, among the detected columns, consecutive columns in a horizontal direction whose number is larger than the third threshold; and determining a set of the pixels as a glint if the set of pixels included in the selected rows and the selected columns and each having the brightness value above the first threshold has a predetermined shape.

According to an another aspect of the present invention provide a computer-readable storage medium having stored a computer program thereon, the computer program, when executed, causing a computer device to perform the operations of: receiving an iris image of a user; detecting, among rows of the iris image, rows in each of which a number of consecutive pixels each having a brightness value above a predetermined first threshold value is larger than a predetermined second threshold value; detecting, among columns of the iris image, columns in each of which a number of consecutive pixels each having a brightness value above the first threshold value is larger than the second threshold value; selecting, among the detected rows, consecutive rows in a column direction whose number is larger than a predetermined third threshold; selecting, among the detected columns, consecutive columns in a row direction whose number is larger than the third threshold; and determining a set of the pixels as a glint if the set of pixels included in the selected rows and the selected columns and each having the brightness value above the first threshold has a predetermined shape.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a view showing a glint created near an iris by the light irradiated from an illumination unit;

FIG. 2 is an enlarged view of a glint formed on an iris image;

FIG. 3 is a diagram for illustrating a process of detecting rows in each of which consecutive pixels each having a brightness value above a predetermined value exist according to an exemplary embodiment of the present disclosure;

FIG. 4 is a diagram for illustrating a process of detecting columns in each of which consecutive pixels each having a brightness value above a predetermined value exist according to an exemplary embodiment of the present disclosure;

FIG. 5 is a diagram for illustrating a process of excluding inconsecutive rows from the detected rows according to an exemplary embodiment of the present disclosure;

FIG. 6 is a diagram for illustrating a process of excluding inconsecutive columns from the detected columns according to an exemplary embodiment of the present disclosure;

FIG. 7 is a diagram for illustrating a process of selecting the row positioned at the center of the selected rows;

FIG. 8 is a diagram for illustrating a process of determining the shape of the set of pixels each having a brightness value above the first threshold value according to an exemplary embodiment of the present disclosure;

FIG. 9 is a diagram for illustrating a process of selecting the column positioned at the center of the selected columns according to another exemplary embodiment of the present disclosure;

FIG. 10 is a diagram for illustrating a process of determining the shape of the set of pixels each having a brightness value above the first threshold value according to an exemplary embodiment of the present disclosure; and FIG. 11 is a flowchart illustrating a method for detecting a glint according to an exemplary embodiment of the present disclosure.

FIG. 12 is a block diagram illustrating an apparatus for detecting a glint according to an exemplary embodiment of the present disclosure.

DETAILED DESCRIPTION OF THE EMBODIMENTS

Hereinafter, exemplary embodiments of the present disclosure will be described in detail with reference to the accompanying drawings. Advantages and features of the present disclosure and methods to achieve them will become apparent from the descriptions of exemplary embodiments herein below with reference to the accompanying drawings. However, the present invention is not limited to exemplary embodiments disclosed herein but may be implemented in various different ways. The exemplary embodiments are provided for making the disclosure of the present invention thorough and for fully conveying the scope of the present invention to those skilled in the art. It is to be noted that the scope of the present invention is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Unless specifically mentioned otherwise, a singular form may include a plural form in the present specification. Throughout this specification, the word "comprise" and variations such as "comprises" or "comprising," will be understood to imply the inclusion of stated constituents, steps, operations and/or elements but not the exclusion of any other constituents, steps, operations and/or elements.

FIG. 2 is an enlarged view of a glint formed on an iris image.

The glint created by the reflection of the light irradiated on a user's eye has such a shape as shown in FIG. 1. Typically, a glint has two characteristics: one of the characteristics is that the pixels that make up the glint have large brightness values. Since a glint is created as light irradiated on the user's pupil region is reflected, the glint appears as a set of pixels with large brightness values when the eye image including the glint is converted to grayscale.

The other one of the characteristics is that a glint has substantially a circle shape. Although a glint has a polygonal shape if it is enlarged up to pixel-level, it generally looks like a circle.

The method for detecting a glint according to an exemplary embodiment of the present disclosure utilizes the above-described two characteristics to detect a glint.

Hereinafter, the method for detecting a glint by using the above-described characteristics will be described in detail.

FIG. 3 is a diagram for illustrating a process of detecting rows in each of which consecutive pixels each having a brightness value above a predetermined value exist according to an exemplary embodiment of the present disclosure.

In the following description, the subject performing each step is not described for the sake of convenience of description. It is to be noted that each step to be described below may be performed by an electronic device having a program installed therein that causes the device to perform the method for detecting a glint.

Initially, a user' iris image is received. As used herein, the iris image may refer to an image of a user's eye captured to acquire iris data. Since the iris image exists in only a part of the image of the user's eyes, the method for detecting a glint according to an exemplary embodiment of the present disclosure can be applied to only the part where the iris image is expected to exist.

For example, if the iris image has the size of 640×480, an algorithm for detecting a glint may be applied only to the central portion of the image where the iris is expected to exist. By applying the method for detecting a glint only to the part where the iris is expected to exist, it is possible to reduce the amount of computation and effectively utilize the computing resources.

Because the time taken for the authentication procedure during a user authentication process using an iris a major determining factor for evaluating the performance of the authentication method, the method for detecting a glint that is applied only to a part of the iris image can save such time and thus becomes an excellent approach.

In the following description, an example of applying an algorithm for detecting a glint only to 320×240 pixels in the center of a 640×480 iris image will be described.

Once an iris image is received, rows are detected, in each of which the number of consecutive pixels each having a brightness value above a predetermined first threshold value is larger than a predetermined second threshold value.

To this end, the brightness values of the pixels of each of the rows of the iris image are sequentially determined. According to an exemplary embodiment of the present disclosure, brightness values of the pixels of the iris image are determined sequentially from the left side row by row. However, the order of determining the brightness values of the pixels is not limited thereto. For example, the brightness values of the pixels may be determined sequentially from the right side to the left side.

In doing so, when a pixel having a brightness value above the first threshold value is detected for the first time, the pixel is determined as a start point. In FIG. 3, a first pixel 310 is the first pixel having a brightness value above the first threshold value, and thus the first pixel 310 is determined as the start point.

Then, the brightness values of the pixels are sequentially determined in the rightward direction, and the last pixel having a brightness value above the first threshold value is determined as the end point. In FIG. 3, a second pixel 320 is the last pixel having a brightness value above the first threshold value, and thus the second pixel 320 is determined as the end point.

Once the start point and the end point are determined, the number of the pixels existing between the start point and the end point is calculated. In other words, the length from the start point to the end point is calculated. If the length from the start point to the end point is larger than the second threshold value and is less than the maximum allowable length, it can be determined that the pixels in the row includes pixels forming the glint.

Typically, a glint image is composed of pixels each having a high brightness value and adjacent to one another. Therefore, in order to find pixels forming a glint, the above-described processes are carried out based on such characteristics.

In addition, considering the typical size of a glint image, if the number of consecutive pixels each having a brightness value above the first threshold in a row is less than the second threshold value, it is determined that the pixels are not included in the glint image.

Likewise, if the consecutive pixels each having a brightness value above the first threshold value exist beyond the maximum allowable length, it is determined that the pixels are not included in the glint image.

By applying the above-described processes to the image of 320×240 where an iris image is expected to exist, it is possible to determine in which of the 320 rows the pixels that are expected to be included in the glint image are located.

After applying the above-described processes to the 320 rows, the same processes are performed on 240 columns.

FIG. 4 is a diagram for illustrating a process of detecting columns in each of which consecutive pixels each having a brightness value above a predetermined value exist according to an exemplary embodiment of the present disclosure.

After the rows in each of which consecutive pixels each having a brightness value above the threshold value exist are detected via the processes described with reference to FIG. 3 is completed, the same processes are applied to each column.

That is, columns are detected, in each of which the number of consecutive pixels each having a brightness value above the first threshold value is larger than the second threshold value.

To this end, the brightness values of the pixels of each of the columns of the iris image are sequentially determined as shown in FIG. 4. According to an exemplary embodiment of the present disclosure, the brightness values of the pixels included in each of the columns of the iris image may be sequentially determined from top to bottom. However, the order of determining the brightness values of the pixels is not limited thereto. For example, the brightness values of the pixels may be determined sequentially from the bottom to the top.

While sequentially determining the brightness values of the pixels, when a pixel having a brightness value above the first threshold value is first detected, the pixel is determined as a start point. In FIG. 4, a third pixel 410 is the first pixel having a brightness value above the first threshold value, and thus the third pixel 410 is determined as the start point.

Then, the brightness values of the pixels are sequentially determined in the downward direction, and the last pixel having a brightness value above the first threshold value is determined as an end point. in FIG. 4, the fourth pixel 420 is determined as the end point.

Once the start point and the end point are determined, the number of the pixels existing between the start point and the end point is calculated. In other words, the length from the start point to the end point is calculated. If the length from the start point to the end point is larger than the second threshold value and is less than the maximum allowable length, it can be determined that the pixels in the column includes pixels forming the glint.

A glint image is composed of pixels each having a high brightness value and adjacent to one another. Therefore, in order to find pixels forming a glint, the above-described processes are carried out based on such characteristics.

By applying the processes of FIGS. 3 and 4 to an image having the size of 320×240, it is possible to detect columns where consecutive pixels each having a large brightness value from among the 320 columns, and rows where consecutive pixels each having a large brightness value from among the 240 rows.

FIG. 5 is a diagram for illustrating a process of excluding inconsecutive rows from the detected rows according to an exemplary embodiment of the present disclosure.

When the processes of FIGS. 3 and 4 are completed, it is possible to detect columns and rows in each of which consecutive pixels each having a brightness value above the first threshold value exist from among the rows and columns of the iris image.

However, it is not yet possible to know whether or not the rows and columns detected via the above-described processes are consecutive to one another.

For example, as shown in FIG. 5, the first row 510 and the second row 520 are detected via the processes described above with reference to FIG. 3 as the number of the pixels each having a brightness value above the first threshold value in each of them is larger than the second threshold value. However, because there are no more consecutive rows, the pixels included in the first row 510 and the second row 520 are not likely to be included in the glint image.

The consecutive pixels that are included in the first row 510 and the second row 520 and each have a large brightness value may not be formed by the reflection of the light irradiated from the illumination unit, but may be either an actual iris image or a part of the sclera, i.e., a white portion of a pupil.

Therefore, the method for detecting a glint according to an exemplary embodiment of the present disclosure includes selecting only the consecutive rows in the column direction whose number is larger than a predetermined third threshold value from among the rows detected via the processes described above with reference to FIG. 3.

Specifically, while the rows are sequentially searched for from the uppermost row to the lowest column, if the row detected in FIG. 3, that is, the row is detected in which the number of consecutive pixels each having a brightness value above the first threshold value is larger than the second threshold value, the row is determined as the start row. In addition, the last consecutive row is determined as the end row.

In FIG. 5, a first row 510 and a third row 530 are start rows of the respective consecutive rows, while a second row 520 and a fourth row 540 are end rows of the respective consecutive rows.

Thereafter, if the length from the start row to the end row is less than a predetermined third threshold value, the rows between the start row and the end row are excluded. The length from the start row to the end row may be calculated as the number of rows from the start row to the end row.

That is, the consecutive rows in the vertical direction are selected only when the number of the rows is larger than the third threshold value.

For example, if the third threshold value is 3, the number of consecutive rows between the first row 510 and the second row 520 is 2, i.e., less than the third threshold value. Therefore, it is determined that the pixels in the first row 510 and the second row 520 are not included in the glint image and are thus excluded.

On the other hand, as the number of consecutive rows between the third row 530 and the fourth row 540 is larger than the third threshold value, the rows existing between the third row 530 and the fourth row 540 are selected.

The above process is equally applied to the columns detected via the process described above with Referring to FIG. 4.

FIG. 6 is a diagram for illustrating a process of excluding inconsecutive columns from the detected columns according to an exemplary embodiment of the present disclosure.

The same processes as described with reference to FIG. 5 are also applied to the columns of the image where the glint is expected to exist.

More specifically, while the columns are sequentially searched for from the leftmost column to the rightmost column, if the column detected in FIG. 4, that is, the column is detected in which the number of consecutive pixels each having a brightness value above the first threshold value is larger than the second threshold value, the column is determined as the start column. In addition, the last consecutive column is determined as the end column.

In FIG. 6, the first column 610 and the third column 630 are the start columns of consecutive columns, while the second column 620 and the fourth column 640 are the end columns of consecutive columns.

Thereafter, if the length from the start column to the end column is less than the third threshold value, the columns between the start column and the end column are excluded. The length from the start column to the end column may be calculated as the number of columns from the start column to the end column.

That is, the consecutive columns in the horizontal are selected only when the number of the columns is larger than the third threshold value.

For example, if the third threshold value is 3, the number of consecutive columns between the first column 610 and the second column 620 is 2, i.e., less than the third threshold value. Therefore, it is determined that the pixels in the first column 610 and the second column 620 are not included in the glint image and are thus excluded.

On the other hand, as the number of consecutive columns between the third column 630 and the fourth column 640 is larger than the third threshold value, the columns existing between the third column 630 and the fourth column 640 are selected.

By performing the above-described processes of FIGS. 5 and 6, it is possible to detect the pixels that are included in the consecutive rows and the consecutive columns and each have brightness values above the first threshold value.

FIG. 7 is a diagram for illustrating a process of selecting the row positioned at the center of the selected rows.

Once the rows and columns that are expected to include the pixels that make up the glint image are selected, it is determined whether the pixels included in the rows and columns form a glint shape. Since the glint created by the reflection of the light irradiated on a user's eye from the illumination unit typically has the shape of a circle, it is determined whether the pixels form a shape similar to a circle.

To this end, the row positioned at the center of the selected rows is determined first via the process described with reference to FIG. 5. More specifically, the row positioned at the center of the rows between the start row 530 and the end row 540 is selected.

Once the center row 550 is selected, the shape of the set of pixels each having a brightness value above the first threshold value is determined by it.

FIG. 8 is a diagram for illustrating a process of determining the shape of the set of pixels each having a brightness value above the first threshold value according to an exemplary embodiment of the present disclosure.

Once the center row 550 is selected via the process described with reference to FIG. 7, the start point of the start row 530 is connected to the start point of the center row 550. Likewise, the end point of the start row 530 is connected to the end point of the center row 550.

As a result, if the line connecting the start point of the start row 530 to the start point of the center row 550 is a stepwise line and the line connecting the end point of the start row 530 to the end point of the center row 550 is a stepwise line, it can be determined that the pixels located in the first and second quadrants are in a circular shape where the center pixel of the center row 550 is the origin.

Likewise, if the line connecting the start point of the end row 540 to the start point of the center row 550 is a stepwise line and the line connecting the end point of the end row 540 to the end point of the center row 550 is a stepwise line, it can be determined that the pixels located in the third and fourth quadrants are in a circular shape where the center pixel of the center row 550 is the origin.

As described above, if it is determined that the set of pixels included in the selected rows and each having brightness values above the predetermined first threshold value has a predetermined shape, i.e., a circle, the set of pixels can be determined as a glint image.

FIG. 9 is a diagram for illustrating a process of selecting the column positioned at the center of the selected columns according to another exemplary embodiment of the present disclosure.

To select the center column positioned at the center of the selected columns, a start column 630 and an end column 640 are selected first. Then, the column positioned at the center of the columns between the start column 630 and the end column 640 is selected as the center column 650.

Once the center column 650 is selected via the above-described process, the shape of the set of pixels each having a brightness value above the first threshold value is determined by using it.

FIG. 10 is a diagram for illustrating a process of determining the shape of the set of pixels each having a brightness value above the first threshold value according to an exemplary embodiment of the present disclosure.

Once the center column 650 is selected via the process described with reference to FIG. 9, the start point of the start column 630 is connected to the start point of the center column 650. Likewise, the end point of the start column 630 is connected to the end point of the center column 650.

As a result, if the line connecting the start point of the start column 630 to the start point of the center column 650 is a stepwise line, and the line connecting the end point of the start column 630 to the end point of the center column 650 is a stepwise line, it can be determined that the pixels located in the second and third quadrants are in a circular shape where the center pixel of the center column 650 is the origin.

Likewise, if the line connecting the start point of the end column 640 to the start point of the center column 650 is a stepwise line, and the line connecting the end point of the end column 640 to the end point of the center column 650 is a stepwise line, it can be determined that the pixels located in the first and fourth quadrants are in a circular shape where the center pixel of the center column 650 is the origin.

As described above, if it is determined that the set of pixels included in the selected columns and each having brightness values above the predetermined first threshold value has a predetermined shape, i.e., a circle, the set of pixels can be determined as a glint image.

By applying the above-described process to the iris image, it is possible to accurately determine the position and size of the glint image included in the iris image. Therefore, it is possible to easily determine whether iris data sufficient to authenticate a user can be obtained from the captured iris image.

For example, if the user authentication is possible only with the iris data of 570 bytes, when the size of the iris data excluding the portion determined as a glint in the iris image is less than 570 bytes, it is determined that the user authentication procedure cannot be performed with the iris image, and thus it may be required to capture the image again.

That is, by excluding the image that cannot be used for user authentication and requesting capturing again, it is possible to reduce the occurrence of errors in user authentication using the iris.

FIG. 11 is a flowchart illustrating a method for detecting a glint according to an exemplary embodiment of the present disclosure.

The method starts with receiving an iris image of a user (step S1110). Subsequently, the method includes detecting rows, in each of which the number of consecutive pixels each having a brightness value above the first threshold value is larger than the second threshold value (step S1120). That is, the rows in each of which the consecutive pixels each having a brightness value above the first threshold value exist.

Subsequently, the method includes repeating the same processes for the columns of the iris image. That is, the method includes detecting columns, in each of which the number of consecutive pixels each having a brightness value above the first threshold value is larger than the second threshold value (step S1130).

Subsequently, the method includes performing a process of excluding inconsecutive rows and columns from the detected rows and columns.

To this end, the method includes selecting the consecutive rows in the vertical direction whose number is larger than the third threshold value from among the detected rows (step S1140). This is to exclude inconsecutive rows from the rows detected in step S1120 based on the idea that a glint image typically appears as a set of pixels having large brightness values.

Likewise, the same process is repeated for the columns detected in step S1130. That is, the method includes selecting consecutive columns in the horizontal direction whose number is larger than the third threshold value from among the detected columns (step S1150).

When the consecutive rows and columns are selected via the above-described process, it is determined whether or not the pixels included in the rows and columns and having brightness values above the first threshold value are in a predetermined shape.

If it is determined that the set of pixels satisfies the requirement, the set of pixels is determined as a glint image (S1160).

By applying the above-described processes, it is possible to accurately detect the glint included in the iris image, such that an unnecessary iris image can be removed in advance during the user authentication process. Further, by excluding an iris image that cannot be used for user authentication in advance, the iris recognition rate can be increased while the error rate can be decreased.

FIG. 12 is a block diagram illustrating an apparatus for detecting a glint according to an exemplary embodiment of the present disclosure.

A mobile device 1200 shown in FIG. 12 includes a processor 1210, a memory 1220, storage 1230, a network interface 1240, and a bus 1250.

It is to be noted that FIG. 12 only shows the elements related to the exemplary embodiments of the present disclosure. Accordingly, those skilled in the art would understand that the mobile device 1000 may further include other elements in addition to those shown in FIG. 12.

The processor 1210 executes a program for detecting a glint. However, the program executed on the processor 1210 is not limited thereto but may include other general-purpose programs.

The storage 1220 stores the program for detecting a glint therein. According to an exemplary embodiment of the present disclosure, the program for detecting a glint, when executed, causes a computer to perform the operations of: receiving an iris image of a user; detecting, among rows of the iris image, rows in each of which a number of consecutive pixels each having a brightness value above a predetermined first threshold value is larger than a predetermined second threshold value; detecting, among columns of the iris image, columns in each of which a number of consecutive pixels each having a brightness value above the first threshold value is larger than the second threshold value; selecting, among the detected rows, consecutive rows in a column direction whose number is larger than a predetermined third threshold; selecting, among the detected columns, consecutive columns in a row direction whose number is larger than the third threshold; and determining a set of the pixels as a glint if the set of pixels included in the selected rows and the selected columns and each having the brightness value above the first threshold has a predetermined shape.

The memory 1230 may load the program for detecting a glint so that the program is executed on the processor 1210.

The network interface 1240 may be connected to a computing device.

The bus 1250 works as a data transfer path among the processor 1210, the storage 1220, the memory 1230, and the network interface 1240.

The above-described method may be implemented as a program that can be executed by a computer, and may be embodied in a computer-readable storage medium to be performed in a general-purpose digital computer that executes the program. In addition, the structure of the data used in the above-described method may be written on a computer-readable storage medium through various means. The computer-readable storage medium includes a storage medium such as a magnetic storage medium (e.g., a ROM, a floppy disk, a hard disk, etc.), and an optical recording medium (e.g., CD-ROM, a DVD, etc.).

It is to be understood that various modifications and changes may be made to the exemplary embodiments of the present disclosure without departing from the gist of the present disclosure. Therefore, the disclosed methods should be interpreted in an illustrative sense rather than a restrictive sense. The scope of the present disclosure is defined solely by the appended claims not by the foregoing description, and all modifications, equivalents and alternatives also fall within the scope of the present disclosure.

What is claimed is:

1. A method for detecting a glint, the method comprising:
   receiving an iris image of a user;
   detecting, among rows of pixels in the iris image, a plurality of rows, wherein each row of the detected plurality of rows includes a set of consecutive pixels, wherein each pixel in the set of consecutive pixels in said each detected row has a brightness above a first threshold value and wherein a length of the set of consecutive pixels in said each detected row is larger than a second threshold value;

detecting, among columns of pixels in the iris image, a plurality of columns, wherein each column of the detected plurality of columns includes a set of consecutive pixels, wherein each pixel in the set of consecutive pixels in said each detected column has a brightness above a first threshold value and wherein a length of the set of consecutive pixels in said each detected column is larger than the second threshold value;

selecting, among the detected plurality of rows, consecutive rows in a vertical direction whose number is larger than a third threshold;

selecting, among the detected plurality of columns, consecutive columns in a horizontal direction whose number is larger than the third threshold; and determining a set of the pixels as a glint if the set of pixels included in the selected consecutive rows and the selected consecutive columns and each having a brightness value above the first threshold has a predetermined shape.

2. The method of claim 1, wherein the selecting the consecutive rows comprises:

sequentially searching for the rows of pixels in the iris image;

upon detecting a row in which a number of consecutive pixels each having a brightness value above the first threshold value is larger than the second threshold value, determining the detected row as a start row; and determining a last consecutive row in which a number of consecutive pixels each having a brightness value above the first threshold value is larger than the second threshold value as an end row; and selecting only rows whose length from the start row to the end row is larger than the third threshold value.

3. The method of claim 2, wherein the selecting only rows whose length from the start row to the end row is larger than the third threshold value comprises:

selecting only rows whose number from the start row to the end row is larger than the third threshold value.

4. The method of claim 1, wherein the selecting the consecutive columns comprises:

sequentially searching for the columns of pixels in the iris image;

upon detecting a column in which a number of consecutive pixels each having a brightness value above the first threshold value is larger than the second threshold value, determining the detected column as a start column;

determining a last consecutive column in which a number of consecutive pixels each having a brightness value above the first threshold value is larger than the second threshold value as an end column; and selecting only columns whose length from the start column to the end column is larger than the third threshold value.

5. The method of claim 4, wherein the selecting only columns whose length from the start column to the end column is larger than the third threshold value comprises:

selecting only columns whose number from the start column to the end column is larger than the third threshold value.

6. The method of claim 2, wherein the determining the set of pixels as a glint comprises:

selecting a center row positioned at a center of the rows between the start row and the end row; and determining the pixels located between the start row and the end row and each having a brightness value above the first threshold value as a glint image, if a line connecting a start point of the start row with a start point of the center row, a line connecting an end point of the start row with an end point of the center row, a line connecting a start point of the end row with the start point of the center row, and a line connecting an end point of the end row with at end point of the center row are stepwise lines.

7. The method of claim 4, wherein the determining the set of pixels as a glint comprises:

selecting a center column positioned at a center of the columns between the start column and the end column; and determining the pixels located between the start column and the end column and each having a brightness value above the first threshold value as a glint image, if a line connecting a start point of the start column with a start point of the center column, a line connecting an end point of the start column with an end point of the center column, a line connecting a start point of the end column with the start point of the center column, and a line connecting an end point of the end column with at end point of the center column are stepwise lines.

8. The method of claim 1, further comprising:

excluding the iris image from a user authentication procedure using an iris if a size of iris data of the iris image minus a glint area is less than a predetermined reference value.

9. An apparatus for detecting a glint, the apparatus comprising:

at least one processor;

a memory configured to load a computer program executed by the processor; and a storage medium having stored a computer program for detecting a glint, wherein the computer program comprises operations of:

receiving an iris image of a user;

detecting, among rows of pixels in the iris image, a plurality of rows, wherein each row of the detected plurality of rows includes a set of consecutive pixels, wherein each pixel in the set of consecutive pixels in said each detected row has a brightness above a first threshold value and wherein a length of the set of consecutive pixels in said each detected row is larger than a second threshold value;

detecting, among columns of pixels in the iris image, a plurality of columns, wherein each column of the detected plurality of columns includes a set of consecutive pixels, wherein each pixel in the set of consecutive pixels in said each detected column has a brightness above a first threshold value and wherein a length of the set of consecutive pixels in said each detected column is larger than the second threshold value;

selecting, among the detected plurality of rows, consecutive rows in a vertical direction whose number is larger than a third threshold;

selecting, among the detected plurality of columns, consecutive columns in a horizontal direction whose number is larger than the third threshold; and determining a set of the pixels as a glint if the set of pixels included in the selected consecutive rows and the selected consecutive columns and each having a brightness value above the first threshold has a predetermined shape.

10. A non-transient computer-readable storage medium having stored a computer program thereon, the computer program, when executed, causing a computer device to perform the operations of:

receiving an iris image of a user;
detecting, among rows of pixels in the iris image, a plurality of rows, wherein each row of the detected plurality of rows includes a set of consecutive pixels, wherein each pixel in the set of consecutive pixels in said each detected row has a brightness above a first threshold value and wherein a length of the set of consecutive pixels in said each detected row is larger than a second threshold value;
detecting, among columns of pixels in the iris image, a plurality of columns, wherein each column of the detected plurality of columns includes a set of consecutive pixels, wherein each pixel in the set of consecutive pixels in said each detected column has a brightness above a first threshold value and wherein a length of the set of consecutive pixels in said each detected column is larger than the second threshold value;
selecting, among the detected plurality of rows, consecutive rows in a vertical direction whose number is larger than a third threshold;
selecting, among the detected plurality of columns, consecutive columns in a horizontal direction whose number is larger than the third threshold; and
determining a set of the pixels as a glint if the set of pixels included in the selected consecutive rows and the selected consecutive columns and each having a brightness value above the first threshold has a predetermined shape.

* * * * *